(12) United States Patent
Loeffler

(10) Patent No.: US 10,232,813 B2
(45) Date of Patent: Mar. 19, 2019

(54) METHOD FOR OPERATING A MOTOR VEHICLE DURING AN EMERGENCY CALL

(71) Applicant: AUDI AG, Ingolstadt (DE)

(72) Inventor: Juergen Loeffler, Munich (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/768,789

(22) PCT Filed: Nov. 7, 2016

(86) PCT No.: PCT/EP2016/076785
§ 371 (c)(1),
(2) Date: Apr. 16, 2018

(87) PCT Pub. No.: WO2017/080940
PCT Pub. Date: May 18, 2017

(65) Prior Publication Data
US 2018/0297543 A1    Oct. 18, 2018

(30) Foreign Application Priority Data
Nov. 13, 2015    (DE) .......................... 10 2015 014 750

(51) Int. Cl.
*B60R 21/01*    (2006.01)
*G08B 25/01*    (2006.01)
(Continued)

(52) U.S. Cl.
CPC ............... *B60R 21/01* (2013.01); *B60R 1/00* (2013.01); *G07C 5/008* (2013.01); *G08B 25/016* (2013.01);
(Continued)

(58) Field of Classification Search
CPC .. G08B 25/016; B60R 201/0027; G07C 5/008
See application file for complete search history.

(56) References Cited

U.S. PATENT DOCUMENTS 6,166,656 A    12/2000 Okada et al.
8,849,104 B2    9/2014 Eder et al.
(Continued)

FOREIGN PATENT DOCUMENTS

CN    1993720 A    7/2007
CN    103448651 A    12/2013
(Continued)

OTHER PUBLICATIONS

International Search Report and Written Opinion directed to related International Patent Application No. PCT/EP2016/076785, dated Feb. 16, 2017, with attached English-language translation; 22 pages.
(Continued)

*Primary Examiner* — Fabricio R Murillo Garcia
(74) *Attorney, Agent, or Firm* — Sterne, Kessler, Goldstein & Fox P.L.L.C.

(57) ABSTRACT

The invention relates to a method for operating a motor vehicle, in which an emergency call of the motor vehicle is made and, through the emergency call, image data from at least one camera of the motor vehicle and state data from at least one vehicle component, which differs from the camera of the motor vehicle are sent out to a vehicle-external facility, wherein the state data is, before being conveyed to the vehicle-external facility, embedded into an image signal formed from the image data in accordance with a predetermined image coding standard, and the image signal with the embedded state data is sent out to the vehicle-external facility.

9 Claims, 2 Drawing Sheets

Figure 1:
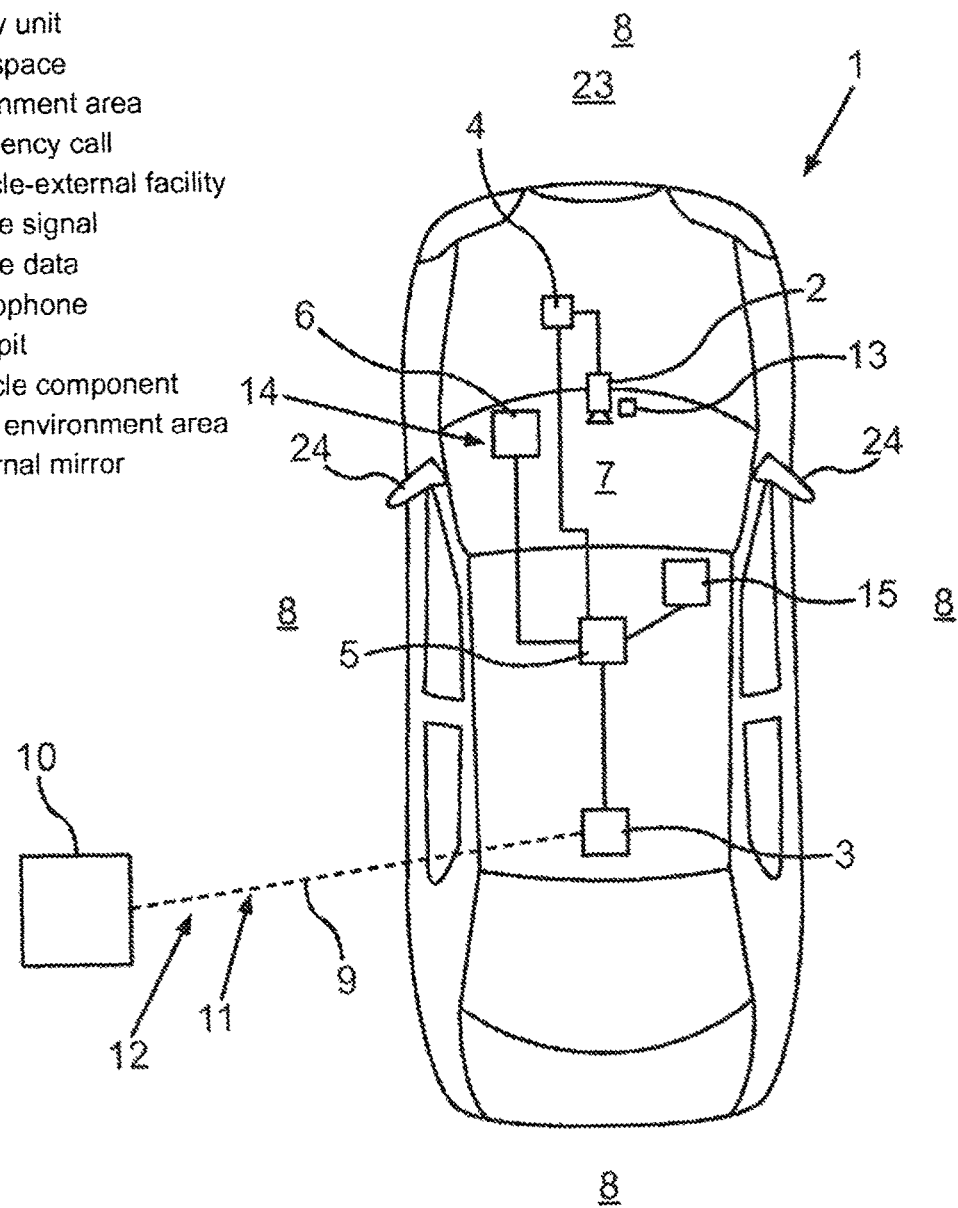

1 = motor vehicle
2 = camera
3 = communication unit
4 = video control unit
5 = main control unit
6 = display unit
7 = inner space
8 = environment area
9 = emergency call
10 = vehicle-external facility
11 = image signal
12 = image data
13 = microphone
14 = cockpit
15 = vehicle component
23 = front environment area
24 = external mirror

(51) Int. Cl.
*B60R 1/00* (2006.01)
*G07C 5/00* (2006.01)
*B60R 21/00* (2006.01)

(52) U.S. Cl.
CPC ... *B60R 2021/0027* (2013.01); *B60R 2300/50* (2013.01)

(56) References Cited

U.S. PATENT DOCUMENTS

| | | | |
|---|---|---|---|
| 9,633,561 | B2 | 4/2017 | Stanek et al. |
| 2007/0243854 | A1 | 10/2007 | Taki et al. |
| 2008/0076384 | A1* | 3/2008 | Sakai ............... G08B 25/08 455/404.2 |
| 2009/0207007 | A1* | 8/2009 | Flick ............... G08G 1/205 340/436 |
| 2015/0120082 | A1 | 4/2015 | Cuddihy et al. |
| 2015/0342542 | A1* | 12/2015 | An ............... A61B 5/747 455/404.2 |

FOREIGN PATENT DOCUMENTS

| | | |
|---|---|---|
| CN | 104275993 A | 1/2015 |
| DE | 19945147 A1 | 3/2000 |
| DE | 102004059713 A1 | 7/2005 |
| DE | 102011076638 A1 | 11/2012 |
| DE | 102011110457 A1 | 1/2013 |
| DE | 102011119094 A1 | 5/2013 |
| DE | 102012003981 A1 | 8/2013 |
| DE | 102013213872 A1 | 2/2015 |
| DE | 102014221527 A1 | 2/2015 |
| DE | 102014200567 A1 | 7/2015 |
| EP | 1188617 A2 | 3/2002 |
| EP | 2146325 A1 | 1/2010 |
| WO | WO 2006/067008 A1 | 6/2006 |

OTHER PUBLICATIONS

English-language abstract of German Patent Application Publication No. DE 102004059713 A1, published Jul. 14, 2005; 1 page.
English-language abstract of German Patent Application Publication No. DE 102011076638 A1, published Nov. 29, 2012; 2 pages.
English-language abstract of German Patent Application Publication No. DE 102011110457 A1, published Jan. 17, 2013; 1 page.
English-language abstract of German Patent Application Publication No. DE 102011119094 A1, published May 23, 2013; 1 page.
English-language abstract of German Patent Application Publication No. DE 102012003981 A1, published Aug. 29, 2013; 1 page.
English-language abstract of German Patent Application Publication No. DE 102013213872 A1, published Feb. 19, 2015; 2 pages.
English-language abstract of German Patent Application Publication No. DE 102014200567 A1, published Jul. 16, 2015; 2 pages.
International Preliminary Report on Patentability directed to related International Patent Application No. PCT/EP2016/076785, dated Oct. 30, 2017, with attached English-language translation; 10 pages.

\* cited by examiner

1 = motor vehicle
2 = camera
3 = communication unit
4 = video control unit
5 = main control unit
6 = display unit
7 = inner space
8 = environment area
9 = emergency call
10 = vehicle-external facility
11 = image signal
12 = image data
13 = microphone
14 = cockpit
15 = vehicle component
23 = front environment area
24 = external mirror

METHOD FOR OPERATING A MOTOR VEHICLE DURING AN EMERGENCY CALL

TECHNICAL FIELD

The invention relates to a method of operating a motor vehicle, wherein an emergency call of the motor vehicle is made. By an emergency call, image data from at least one camera of the motor vehicle and state data from at least one vehicle component of the motor vehicle, other than the camera, are sent out to a vehicle-external facility. Furthermore, the invention relates to a motor vehicle, which comprises a camera, a vehicle component other than the camera, and a communication unit for making an emergency call and for sending out the image data of the camera and the state data of the vehicle component to a vehicle-external facility.

BACKGROUND

A method of operating a motor vehicle, wherein an emergency call of the vehicle is made, is known from the prior art. Thus, DE 10 2014 200 567 A1 describes a method for conveying image- and/or audio data of a vehicle accident to a further-processing location. The image- and/or audio data is recorded before the accident and stored. If a vehicle accident is detected, the stored image- and/or audio data is made available to a further-processing site. In addition to the image data, the data of a radar system can be recorded, stored in the memory, and made available to a further-processing location.

DE 10 2011 076 638 A1 discloses a method for vehicle communication via a vehicle-implemented vehicle-diagnostic system. It transmits the vehicle diagnostics data of a vehicle from the vehicle-implemented vehicle-diagnostic system via an air interface to a mobile user communication sending device.

In DE 10 2011 110 457 A1, an integrated taxi emergency call system for a direct transfer via a smartphone is described. The system made the monitoring of the interior space of a taxi vehicle possible. Upon activation of an alarm button, the images of the vehicle interior are conveyed simultaneously to an emergency call center via smartphone. Then, the emergency call center can witness what is taking place in the taxi vehicle within seconds, and can intervene as quickly as possible by sound and image in the event and thus de-escalate and control the situation.

EP 2 146 325 A1 describes a recording device for the recording and editing of image data in a vehicle. The recording device comprises an image processor for processing the image data in a vehicle, which are displayed together with other vehicle data in the data structure of a vehicle bus system as mixed data.

From DE 10 2012 003 981 A1, a system and a method for recording the data of a motor vehicle drive is known. Here, a display device displays image data together with at least one operating parameter of a motor vehicle.

DE 10 2013 213 872 A1 describes a vehicle with a triggering device and a method for recording and/or reporting an accident situation. Through this, multiple image recording devices record video image information and store it in a memory device in association with the calibration data of the respective image detection devices.

BRIEF DESCRIPTION OF DRAWINGS/FIGURES

Figure 2:
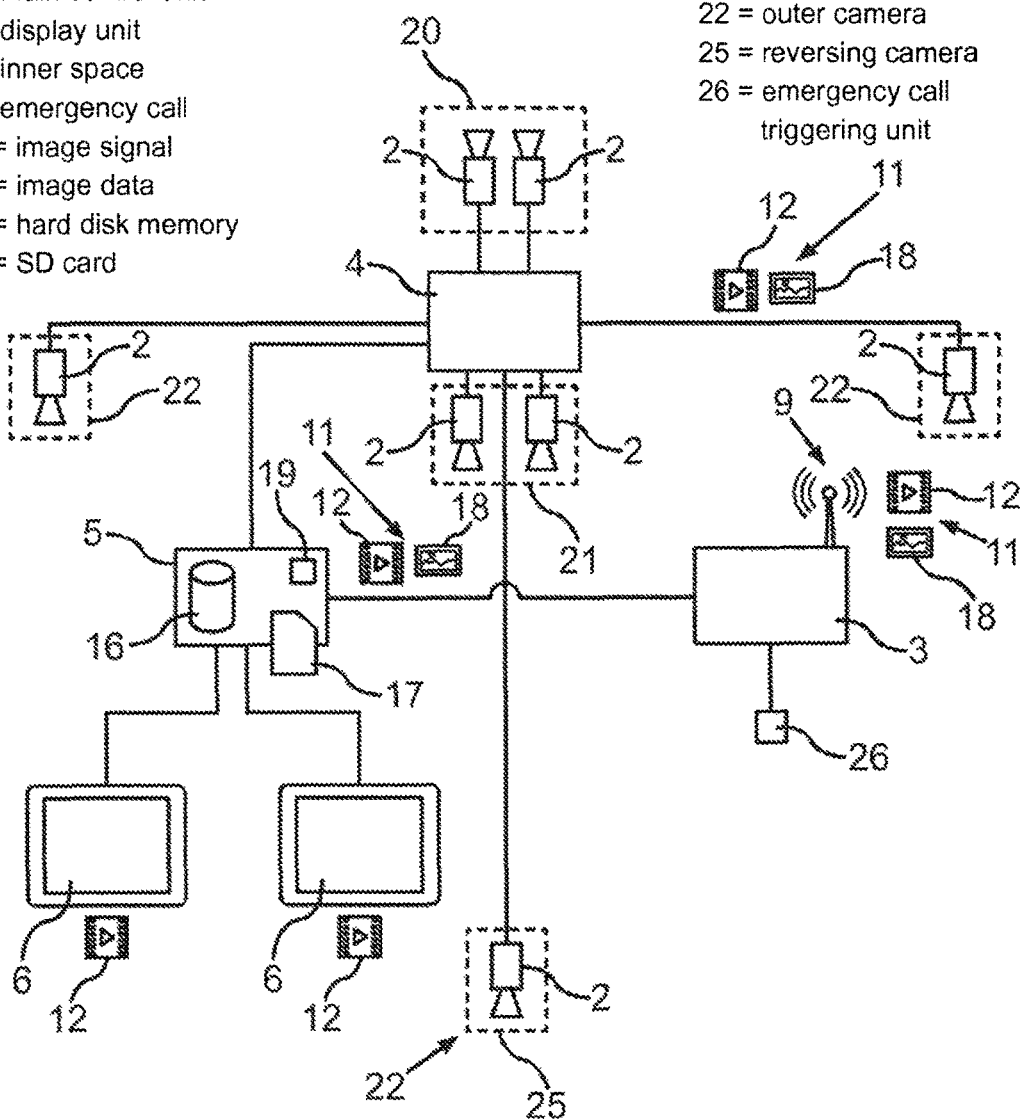

FIG. 1 is a schematic plan view of an embodiment of a motor vehicle according to the invention; and FIG. 2 is a schematic representation of multiple cameras of the motor vehicle, a video control unit of the motor vehicle, a main control unit of the motor vehicle, and a communication unit of the motor vehicle. In the figures, identical or functionally identical elements are provided with the same reference numerals.

DETAILED DESCRIPTION

It is an object of the invention to provide a method as well as a motor vehicle, with which the motor vehicle can be safely operated.

This object is inventively achieved by a method as well as a motor vehicle with the features according to each of independent claims.

In the inventive method, a vehicle is operated. An emergency call of the motor vehicle is made. By the emergency call, the image data from at least one camera of the motor vehicle and the state data from at least one vehicle component of the motor vehicle, other than the camera, are sent out to a vehicle-external facility. An essential idea of the invention is that the state data is embedded, prior to conveyance to a vehicle-external facility, in an image signal formed out of the image data according to a predetermined image encoding standard, and that the image signal with the embedded state data is sent out to a vehicle-external facility.

The invention is based on the realization that the embedding of state data in an image signal results in that the state data can be easily analyzed in a vehicle-external facility. Through this, it can respond to an emergency call from a motor vehicle more reliably.

An emergency call of the vehicle can be made, for example, automatically by an accident of the motor vehicle or manually by the occupant of the motor vehicle. Such an emergency call is also referred to as "eCall." The emergency call is made, for example, by an on-board system of the motor vehicle, and, for example, conveyed via a public mobile network to a trained emergency call center as a vehicle-external facility. In this case, particularly a sound connection between a motor vehicle and a vehicle-external facility is produced. In addition, the image data is sent out from a motor vehicle through an emergency call, and preferably is conveyed to a vehicle-external facility. By this, an operator in the vehicle-external facility can better evaluate the type and the severity of an accident, and for example, the condition of the vehicle occupant and/or the vehicle environment by analyzing the image data, and initiate corresponding help.

The conveyed state data of the vehicle component, in addition to image and sound data, then, for example, provides helping information about the motor vehicle, especially at the time of a collision. The state data can describe, for example, the condition of a vehicle and/or the condition of a motor vehicle component, for example, the control device of a motor vehicle. In this case, the current measurement value of a sensor is also regarded as a condition value of the sensor.

By embedding state data in an image signal, the state data can be more easily conveyed to a vehicle-external facility and be evaluated more easily and quickly in the vehicle-external facility. The image coding standard can be, for example, a JPEG File Interchange Format (JFIF) or MPEG-4/AVC (Advanced Video Coding) according to the MPEG-4 standard. By embedding state data in an image signal, the integration of the state data in the image signal is achieved. The vehicle-external facility can now read in the presence of a decoding method according to the image coding standard, which reads the embedded state data in the image signal in a simple manner. Therefore, it is not necessary, in particular, that state data is transferred as a separate signal in addition to an image signal to a vehicle-external facility.

According to the invention, it is provided that after conveying an emergency call to a vehicle-external facility, an image instruction for the occupant of a motor vehicle is received from the vehicle-external facility, and the image instruction is displayed for the occupant on the display unit of the motor vehicle and/or on one of the mobile unit coupled with the motor vehicle. By the image instruction, for example, a demo video is pictured, which contains information on the behavior in an emergency situation. So in a vehicle-external facility, for example, variously prefabricated and situation-specific image instructions for the occupant of the motor vehicle can be presented. The image instruction can now, for example, be transferred automatically to the motor vehicle from the vehicle-external facility, upon the detection of a particular situation of the occupant of the motor vehicle by the vehicle-external facility. Specifically, the image instruction is different from an image conversation or a video phone, in which an operator of the vehicle-external facility has a direct contact with the occupants of a motor vehicle. The image instruction is designed, in particular, in such a way that it is to provide, for example, a procedure for a standard solution to the problem regarding the identified situation, in which the occupant is currently located. Thus, the motor vehicle is operated again safely.

It is preferably provided that state data is embedded as metadata of the image coding standards in an image signal. The metadata can then, for example, be embedded in the header of an image signal. But the state data can also be embedded, for example, in a blanking interval of an image signal. Thus, an image signal can be effectively used to send out state data to a vehicle-external facility.

Furthermore, it is preferably provided that state data is embedded as visible image information in an image signal. Thus, state data can be embedded in an image signal in such a way that, for the display of image data on the display unit of a vehicle-external facility, at the same time a graphical presentation of the state data is carried out. For this purpose, state data can be recorded or rendered, for example, as graphical symbols in the visible image information of an image signal. An operator of the vehicle-external facility can take the state data then already visually processed when viewing the image data. With this, the analysis of state data is accelerated, and thereby the motor vehicle is operated more safely.

Furthermore, it can be provided that image data is provided as an image sequence having multiple frames from the camera, and that each state data of a vehicle component recorded at the time of recording each frame is embedded in the image signal portion of each frame. Thus, each of the frames, for example, is provided with one or more data fields, in which the state data of the vehicle component is incorporated. The status data is then, in particular, the status data of the vehicle component, which is current at the time of the recording of the respective frames. It is advantageous that already the time allocation of the state data is made to the image data. Thus, it is no longer necessary to compare the timestamp of the state data with the time stamp of the image data to provide the corresponding state data for each corresponding frame. The analysis of state data along with image data can be done more accurately and quickly. Image data is presented in particular as video data.

In a further embodiment, it may be provided that the image data prior to being sent out to a vehicle-external facility from a motor vehicle, based on reference image data and/or the sensor data of the sensors of the motor vehicle, is at least partially analyzed, and the result of the analysis is embedded in the image signal of the image data. With the partial analysis of image data, a preliminary analysis on the condition of the motor vehicle may already be provided to a vehicle-external facility. This preliminary analysis about the condition of the motor vehicle therefore does not have to be produced even by analyzing the image data in the vehicle-external facility. The vehicle-external facility can thus respond more quickly and reliably to an emergency call. For example, a computing module in the motor vehicle continuously compares the image data of the camera with predefined patterns, or reference image data, and thus can classify an accident situation, such as a collision with a running motor vehicle, a collision with a motorcycle, a collision with a pedestrian or the like. In the automated analysis of image data, for example, the sensor data such as the speed of a motor vehicle and/or the acceleration of a motor vehicle can be used to improve the result of the analysis.

Furthermore, it may be provided that state data is embedded in image data prior to making an emergency call. Image data is stored in a communication unit of a motor vehicle with the embedded state data at predetermined time intervals, and is kept for being sent out to a vehicle-external facility. Thus image data and state data are stored, for example, in the main memory of a communication unit, and then can, for example, in spite of the damage of a different vehicle component in the motor vehicle, be sent to a vehicle-external facility from the communication unit. In a further embodiment, for example, a vehicle component, which forwards image data and state data to the communication unit of the motor vehicle, already has an antenna module and the ability to transfer the image signal to a vehicle-external facility. With this, for example, the conveyance of the image signal to a vehicle-external facility is possible, in case the communication unit is damaged. Overall, an image signal can be reliably sent out from a motor vehicle to a vehicle-external facility.

Furthermore, it may be provided that the sensor data at least recorded and stored in a memory is embedded in an image signal as state data, in which, as the sensor data, a longitudinal acceleration of a motor vehicle and/or a lateral acceleration of a motor vehicle and/or an inclination angle of a motor vehicle and/or distance to an arranged object in the environment area of a motor vehicle is embedded in an image signal. The state data can be read, for example, via existing data buses in a motor vehicle. The longitudinal acceleration of a motor vehicle and/or the lateral acceleration of a motor vehicle is recorded, in particular at the time of collision of the motor vehicle. But sensor data can also be provided over a predetermined time period as sensor data history. Vehicle acceleration can be effected, for example, depending on multiple axles of a motor vehicle. The distance to the object in the environment area can be provided, for example, by a radar sensor of a motor vehicle. So, for example, the object lists of objects in the environment area can also be provided by a radar sensor. As sensor data, braking torque of a motor vehicle and/or engine torque of a motor vehicle can be recorded. With sensor data, state data is described in more detail, and thereby also the information, which is sent out by an emergency call from the vehicle to a vehicle-external facility, can be provided more accurately and informatively. The motor vehicle is in turn operated safely.

In a further embodiment, it can be provided that the position of a motor vehicle and/or the sensor information of a belt retractor of a motor vehicle and/or the sensor information of an airbag of a motor vehicle is embedded in an image signal as state data. The position of a motor vehicle, for example, can be provided by a GNSS receiver (GNSS-Global Navigation Satellite System), such as a GPS (Global Positioning System). The sensor information of a seat belt retractor or the safety information of an air bag, for example, can provide information as to whether the seat belt retractor or the airbag has been triggered during a collision of the motor vehicle. Thereby, the image data can, in turn, be sent out with the state data to a vehicle-external facility meaningfully and informatively. Thus, the motor vehicle is operated safely.

The invention also relates to a motor vehicle, which comprises a camera, a vehicle component other than the camera, and a communication unit for making an emergency call and for sending out the image data of the camera and the state data of the vehicle component to a vehicle-external facility. As an essential idea of the invention, it is provided that the motor vehicle has an encoding unit, which is designed to embed state data in an image signal of image data before conveying it to a vehicle-external facility according to a predetermined image coding standard, and the communication unit of the motor vehicle is designed to send out the image signal with the embedded state data to a vehicle-external facility.

The preferred embodiments, presented with reference to the inventive method, and the advantages thereof apply correspondingly to the inventive motor vehicle.

Further features of the invention are from the claims, the figures and the figure description. The above features and the combinations of the features mentioned in the description and in the following description of the figures and/or solely presented features and the combinations of the features in the figures are usable not only in the respective specified combinations, but also in other combinations or alone, without leaving the scope of the invention. There are also embodiments of the invention to be included and revealed to view, which are not explicitly presented or explained in the figures, but can be developed and generated through the separated combinations of the features from the illustrated embodiments. The embodiments and the combinations of the features are also to be regarded as disclosed, which do not have all the features of an originally formulated independent claim.

The embodiments of the invention are explained in detail below with reference to the schematic drawings.

In FIG. 1, a motor vehicle 1 with a camera 2, a communication unit 3, a video control unit 4, a main control unit 5, and a display unit 6 is presented schematically.

The camera 2 is built, for example, as an interior camera to capture the inner space 7 of the motor vehicle 1. Additionally or alternatively, the camera 2 can also be arranged on a front, a rear or a side of the motor vehicle 1, and be designed as an external camera. Preferably, the camera is therefore arranged in such a way on the vehicle 1, that at least partly the inner space 7 and/or the environment area 8 of the motor vehicle 1 can be detected. The motor vehicle 1 may also comprise multiple cameras 2, which are then arranged, for example, in various positions of the motor vehicle. The camera 2, for example, can be configured as a CMOS camera (Complementary Metal Oxide Semiconductor) or a CCD camera (charge-coupled device) or as any type of image capturing device. The camera 2 preferably provides an image sequence. The image sequence is then processed, for example in real time by the video control unit 4.

The communication unit 3 can be arranged as desired on the vehicle 1. The communication unit 3 is designed to make an emergency call 9 to a vehicle-external facility 10. An emergency call 9 can be transferred, for example through a public mobile network. Furthermore, an image signal 11 of image data 12 of the camera 2 is sent out to the vehicle-external facility 10 through an emergency call 9. For example, after the triggering of an emergency call 9, for example, a public safety answering point, an IP connection for the transfer of the image signal 11 of the image data 12 or video data is established between the motor vehicle 1 and the vehicle-external facility 10. As a transfer method between the motor vehicle 1 and the vehicle-external facility 10, for example ONVIF format (Open Network Video Interface Forum) can be used.

The image data 12 comprises, for example, the view of the camera 2 in the inner space 7 and a sound signal from the inner space 7. The sound signal can be picked up, for example, by a microphone 13 of the motor vehicle 1.

The video control unit 4 may also be variously arranged in the motor vehicle 1 and is connected to the camera 2 and the main control unit 5. The main control unit 5 in turn can also be arranged variously in the motor vehicle 1 and is preferably connected to the communication unit 3.

The display unit 6 is arranged, for example, in a cockpit 14 of the motor vehicle 1. However, the display unit 6 can also be variously arranged in the motor vehicle 1, however preferably, so that the occupant of the motor vehicle 1 can view the display unit 6. The display unit 6 is built to display the image data 12. Thus, the display unit 6 is built, for example, as a liquid crystal display.

The motor vehicle 1 further comprises a vehicle component 15, which is built, for example as a radar sensor, an air bag, the lateral acceleration sensor, a longitudinal acceleration sensor, an inclination angle sensor, an engine torque sensor, a belt retractor or various sensors of the motor vehicle 1. The vehicle component 15 is in particular connected to the main control unit 5.

FIG. 2 shows the interconnection of the units of the motor vehicle 1 for carrying out the method. There are multiple cameras 2 connected to the video control unit 4. The cameras 2 are preferably arranged at various locations on the motor vehicle 1. At least one of the cameras 2 is preferably directed into the interior space of the motor vehicle 1, and detects particularly the driver of the motor vehicle 1. The video control unit 4 can, for example, be integrated into one of the cameras 2, or be built separately. The video control unit 4 is connected to the main control unit 5. The main control unit 5 has a hard disk memory 16 and an SD card 17 (Secure Digital Memory Card). The main control unit 5 is connected to the communication unit 3 and multiple display units 6.

By the cameras 2, image data 12 is recorded. By the vehicle component 15, state data 18 is provided. The state data 18, for example, exhibits the current condition of the vehicle component 15 or the time of collision of the motor vehicle 1 or a time course. The state data 18 comprises, for example the sensor data of a sensor of the motor vehicle 1. Thus, for example, the data of an environment sensor of the motor vehicle 1, for example, a radar sensor, is described by the state data 18.

The state data 18 are then preferably embedded in an image signal 11 by means of an encoding unit 19 of the motor vehicle 1. The encoding unit 19 is arranged, for example, in the main control unit 5. However, the encoding unit 19 can be, for example, also arranged in the video control unit 4, in the communication unit 3 or as a separate unit in the motor vehicle 1. By the encoding unit 19, the integration of the state data is carried out in the image signal 11. This can, for example, be carried out in a way that the state data 18 is embedded in the image signal 11 as metadata of an image coding standard, or that the state data 18 is embedded in the image signal 11 as a visible image information. In the case that the state data 18 is embedded as a visible image information in the image signal 11, the state data is rendered in particular in graphic symbols.

The image data 12 are in particular provided as an image sequence with multiple frames from the camera 2. The image sequence is built, for example, as a video stream. By transferring the multiple frames of the image data 12 to the vehicle-external facility 15, the frames can, for example, be conveyed, which, prior to making an emergency call 9, were recorded by the camera 2. The images can be made before making an emergency call 9, for example, at predetermined time intervals, for example of −0.1 s, −0.2 s, −0.3 s, −0.4 s, −0.5 s, −1 s, −2 s, −3 s, −4 s, −5 s, −10 s, −20 s, −30 s. The image data 12 can be sent out from the motor vehicle 1 after a request by a vehicle-external facility 10. Thus, a particular frame of the image data 12 can, for example, be requested from the vehicle-external facility 10. In particular, it is provided that the image data 12 is continuously transferred. In this case, for example, the frames of the camera 2 are transferred continuously after the triggering of an emergency call 9, which are detected in a configurable time interval, for example every 100 ms. Furthermore, it is preferably provided that the image data 12 from multiple images of different cameras 2 is transferred, in particular as composite image files. Thereby, the images recorded by the cameras 2 at a given time point are packaged to the image data 12, in particular into composite image files, for example, in order to obtain a panoramic view illustration of the motor vehicle 1.

But the image data 12 can be transferred as a video file. The video file can include, for example, the image data 12 captured up to the point of making an emergency call 9. The video data is then compressed, for example, in a standardized format, such as MPEG-4/AVC (Advanced Video Coding). The length of the video file, for example, is configurable and can be configured to, for example, be 60 seconds. In particular, the resolution of the image data 12 provided by the cameras 2 can be adjusted. For example, the resolution of the image data 12 can be adjusted to an available transfer bandwidth between a motor vehicle 1 and a vehicle-external facility 10.

For example, the image data 12 of the camera 2, which captures interior space 7, as default, is sent out to the vehicle-external facility 10. In addition, the image data 12 of other cameras 2, which record, for example, the environment area 8 of the motor vehicle 1, can then, for example, be requested by the vehicle-external facility 10, and thereby be sent out from the motor vehicle 1 to the vehicle-external facility 10.

The cameras 2, according to FIG. 2, as front cameras 20 of the motor vehicle 1, interior space cameras 21 of the motor vehicle 1 and outer cameras 22 of the motor vehicle 1 can be built. The front cameras 20 of the motor vehicle 1 are preferably oriented to the front environment area 23 of the environment area 8. The interior space cameras 21 are preferably oriented to the interior space 7 of the motor vehicle 1 and capture particularly the driver of the motor vehicle 1. The external cameras 22 are arranged, for example, on exterior mirrors 24 of the motor vehicle 1 and aligned counter to the current driving direction of the motor vehicle 1. A camera 2 of the outer cameras 22 can, for example, be built as a reversing camera 25.

The image data 12 is transferred from the cameras 2 to the video control unit 4, and from the video control unit to the main control unit 5. In the main control unit 5, the image data 12 can then be stored, for example, in the hard disk memory 16 or the SD card 17. The main control unit 5 is attached, for example, via an Ethernet connection to the communication unit 3. The communication unit 3 is then in particular has a mobile phone connection to the vehicle-external facility 10, if necessary. To the communication unit 3, an emergency call triggering unit 26 is connected. By the emergency call triggering unit 26, an emergency call 9 is triggered.

The main control unit 5 has one or more of the display units 6 to display the image data 12. Upon the triggering of an emergency call 9, the communication unit 3 requests the image data 12 from the main control unit 5 and conveys it to the vehicle-external facility 10. Further, the communication unit 3 can build up a connection with the vehicle-external facility 10 for transferring a video stream, and transfer video streams bidirectionally to the main control unit 5. By transmitting the video stream, an image instruction, for example, can be transferred for the occupant of the motor vehicle 1. By the image instruction, suggestions for problem solving can then be provided to the occupant for its current situation.

Additionally or alternatively, the communication unit 3 continuously stores the image data 12, which is conveyed from the main control unit 5 in the main memory of the communication unit 3 to the vehicle-external facility 10 when an emergency call 9 is triggered. Then, if there is damage to the main control unit 5, the image data 12 can also be transferred to the vehicle-external facility 10.

Further, additionally or alternatively, the main control unit 5 has an antenna module and the ability to transfer the image data 12 to the vehicle-external facility 10.

Already existing control devices of the motor vehicle 1 can also be used in order to take over, for example, the task of the video control unit 4 and/or the main control unit 5. For example, a central driver assistance system can take over the tasks of the video control unit 4, and for example, it is also possible for a central computer of an infotainment system to take over the tasks of the main control unit 5.

The invention claimed is:

1. A method of operating a motor vehicle, comprising:
   making an emergency call from the motor vehicle upon identification of an emergency situation of an occupant of the motor vehicle;
   sending out image data of an image taken by at least one camera of the motor vehicle and state data of at least one vehicle component of the motor vehicle, other than the at least one camera, to a vehicle-external facility through the emergency call;
   wherein the at least one vehicle component comprises built-in safety elements of the motor vehicle;
   the sending out image data including embedding the state data in respective frames of an image sequence of an image signal built from the image data according to a predetermined image coding standard prior to being transferred to the vehicle-external facility, and the image signal is sent out with the embedded state data to the vehicle-external facility;
   subsequent to making the emergency call, receiving, by the motor vehicle and from the vehicle-external facility, an image instruction for the occupant of the motor vehicle; and selectively electing between a display unit of the motor vehicle and a mobile unit coupled with the motor vehicle, for displaying the image instruction for the occupant of the motor vehicle, wherein the image instruction received from the vehicle-external facility is one of variously prefabricated situation-specific image instructions for the occupant of the motor vehicle; and the received image instruction provides a procedure for a standard solution to a problem regarding the identified emergency situation in which the occupant of the motor vehicle is currently located.

2. The method of claim 1, further comprising:
embedding the state data in the image signal as metadata of image coding standards.

3. The method of claim 1, further comprising:
embedding the state data in the image signal as visible image information.

4. The method of claim 1, further comprising:
providing the image data as the image sequence with multiple frames from the at least one camera; and
wherein the embedding the state data includes embedding the state data of the at least one vehicle component, captured at a time of recording each frame of the multiple frames, in an image signal portion of each respective frame.

5. The method of claim 1, further comprising:
at least partially analyzing the image data prior to being sent out to the vehicle-external facility, the partially analyzing being based on comparing between a reference image data and sensor data from sensors of the motor vehicle; and
embedding a result of the analysis in the image signal.

6. The method of claim 1, wherein:
the embedding the state data includes embedding the state data in the image data prior to making the emergency call, the method further comprising:
storing the image data with the embedded state data in a communication unit of the motor vehicle at predetermined time intervals; and
maintaining the image data for being sent out to the vehicle-external facility.

7. The method of claim 1, wherein:
the embedding the state data includes embedding a sensor data at least recorded and stored in a memory, as the state data, in the image signal, wherein as the sensor data, a longitudinal acceleration of the motor vehicle, a lateral acceleration of the motor vehicle, an inclination angle of the motor vehicle, or distance to an arranged object in an environment area of the motor vehicle is embedded in the image signal.

8. The method of claim 1, wherein:
the embedding the state data includes embedding in the image signal, as the state data, a position of the motor vehicle, a sensor information of a seat belt retractor of the motor vehicle, and a sensor information of an airbag of the motor vehicle.

9. A motor vehicle, comprising:
a camera;
a vehicle component other than the camera; wherein the vehicle component comprises built-in safety elements of the motor vehicle;
a communication circuit for making an emergency call, upon identification of an emergency situation of an occupant of the motor vehicle, and for sending out image data of an image taken by the camera and state data of the vehicle component to a vehicle-external facility; and
a coding circuit designed to embed the state data in respective frames of an image sequence of an image signal of the image data according to a predetermined image coding standard, prior to transferring it to the vehicle-external facility, wherein:
a) the communication circuit of the motor vehicle sends out the image signal with the embedded state data to the vehicle-external facility,
b) the motor vehicle is configured to:
i) subsequent to making the emergency call to the vehicle-external facility, receive, from the vehicle-external facility, an image instruction for the occupant of the motor vehicle from the vehicle-external facility; and
ii) selectively elect between a display unit of the motor vehicle and a mobile unit coupled with the motor vehicle, to display the image instruction for the occupant of the motor vehicle, and
c) wherein the image instruction received from the vehicle-external facility is one of variously prefabricated situation-specific image instructions for the occupant of the motor vehicle; and the received image instruction provides a procedure for a standard solution to a problem regarding the identified emergency situation in which the occupant of the motor vehicle is currently located.

* * * * *